United States Patent
Brown et al.

(10) Patent No.: US 7,522,631 B1
(45) Date of Patent: Apr. 21, 2009

(54) METHOD AND APPARATUS FOR EFFICIENT DATA TRANSMISSION CONTROL IN A WIRELESS VOICE-OVER-DATA COMMUNICATION SYSTEM

(75) Inventors: James M. Brown, San Diego, CA (US); Yu-Dong Yao, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 09/429,406

(22) Filed: Oct. 26, 1999

(51) Int. Cl.
*H04J 3/16* (2006.01)
(52) U.S. Cl. ........................ 370/466; 370/352
(58) Field of Classification Search ................ 370/493, 370/494, 495, 434, 433, 435, 465, 468, 310; 375/277
See application file for complete search history.

(56) References Cited

U.S. PATENT DOCUMENTS

| | | | | |
|---|---|---|---|---|
| 5,398,258 | A * | 3/1995 | Su et al. ..................... | 375/277 |
| 5,414,796 | A | 5/1995 | Jacobs et al. | |
| 5,418,912 | A * | 5/1995 | Christenson ................ | 709/234 |
| 5,515,375 | A * | 5/1996 | DeClerck .................... | 370/468 |
| 5,896,374 | A | 4/1999 | Okumura et al. | |
| 5,953,322 | A | 9/1999 | Kimball | |
| 5,970,062 | A | 10/1999 | Bauchot | |
| 6,076,161 | A | 6/2000 | Cheng | |
| 6,078,564 | A * | 6/2000 | Lakshman et al. .......... | 370/235 |
| 6,094,423 | A * | 7/2000 | Alfano et al. ............... | 370/310 |
| 6,104,726 | A * | 8/2000 | Yip et al. .................... | 370/468 |
| 6,205,498 | B1 * | 3/2001 | Habusha et al. ............. | 710/29 |
| 6,262,994 | B1 * | 7/2001 | Dirschedl et al. ........... | 370/465 |
| 6,301,249 | B1 * | 10/2001 | Mansfield et al. ........... | 370/394 |
| 6,307,839 | B1 * | 10/2001 | Gerszberg et al. ........... | 370/235 |
| 6,359,877 | B1 * | 3/2002 | Rathonyi et al. ............ | 370/349 |

(Continued)

FOREIGN PATENT DOCUMENTS

WO    9925088    5/1999

(Continued)

OTHER PUBLICATIONS

Douglas E. Corner, Internetworking with TCP/IP Principles, Protocols, and Architectures Fourth Edition, Prentice Hall, 1995 pp. 102-104 & 221-223.*

(Continued)

*Primary Examiner*—Robert W Wilson
(74) *Attorney, Agent, or Firm*—Katherine Umpleby; Darren M. Simon

(57) ABSTRACT

A method and apparatus for efficient data transmission in a wireless voice-over-data communication system. In a transmitter, data segments are transmitted in accordance with a predefined data protocol. The predefined data protocol is modified to define a first segment size and a second segment size. The first segment size represents a minimum segment size that can be transmitted. The second segment size represents a maximum segment size that can be transmitted. A segment is created and transmitted whenever a quantity of time-sensitive information available for transmission allows a segment to be constructed having a segment size between the minimum segment size and the maximum segment size. A segment of any size up to the maximum segment size is also created and transmitted whenever any time-sensitive information is available for transmission and an acknowledgement message is received by the transmitter.

21 Claims, 3 Drawing Sheets

U.S. PATENT DOCUMENTS

| | | | |
|---|---|---|---|
| 6,421,353 B1 * | 7/2002 | Kim | 370/465 |
| 6,434,140 B1 * | 8/2002 | Barany et al. | 370/352 |
| 6,437,711 B1 | 8/2002 | Nieminen et al. | |
| 6,567,428 B1 * | 5/2003 | Rubin et al. | 370/538 |
| 6,587,684 B1 | 7/2003 | Hsu et al. | |
| 6,650,652 B1 | 11/2003 | Valencia | |
| 6,697,352 B1 | 2/2004 | Ludwig et al. | |
| 6,700,902 B1 * | 3/2004 | Meyer | 370/468 |
| 6,728,263 B2 * | 4/2004 | Joy et al. | 370/468 |
| 6,925,060 B2 * | 8/2005 | Mangin | 370/237 |

FOREIGN PATENT DOCUMENTS

| | | |
|---|---|---|
| WO | 9933230 | 7/1999 |

OTHER PUBLICATIONS

International Preliminary Exam Report - PCT/ US00/029449, International Search Authority - European Patent Office - Jun. 30, 2001.

International Search Report - PCT/ US00/029449, International Search Authority - European Patent Office - Mar. 27, 2001.

* cited by examiner

METHOD AND APPARATUS FOR EFFICIENT DATA TRANSMISSION CONTROL IN A WIRELESS VOICE-OVER-DATA COMMUNICATION SYSTEM

CROSS-REFERENCE TO RELATED APPLICATIONS

The present application is related to application Ser. No. 10/345,002, entitled "METHOD AND APPARATUS FOR EFFICIENT DATA TRANSMISSION CONTROL IN A WIRELESS VOICE-OVER-DATA COMMUNICATION SYSTEM," filed Jan. 14, 2003, and assigned to the assignee hereof.

BACKGROUND

I. Field

The disclosed embodiments pertain generally to the field of wireless communications, and more specifically to providing an efficient method and apparatus for transmitting time-sensitive information in a wireless voice-over-data communication system.

II. Background

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively as IS-95), ANSI J-STD-008, IS-99, IS-657, IS-707, and others, are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459 entitled "System and Method for Generating Signal Waveforms in a CDMA Cellular Telephone System", which is assigned to the assignee of the present invention and incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTICHANNEL DEMODULATOR, which is assigned to the assignee of the present invention and incorporated herein by reference. In CDMA systems, over-the-air power control is a vital issue. An exemplary method of power control in a CDMA system is described in U.S. Pat. No. 5,056,109 entitled "Method and Apparatus for Controlling Transmission Power in A CDMA Cellular Mobile Telephone System" which is assigned to the assignee of the present invention and incorporated herein by reference.

Under Interim Standards IS-99 and IS-657 (referred to hereinafter collectively as IS-707), an IS-95-compliant communications system can provide both voice and data communications services. Data communications services allow digital data to be exchanged between a transmitter and one or more receivers over a wireless interface. Examples of the type of digital data typically transmitted using the IS-707 standard include computer files and electronic mail. More recently, data protocols, such as those specified by IS-707, have been used to transmit time-sensitive information, such as audio or video information. Transmitting time-sensitive information using data protocols is advantageous in such applications as encryption and distributing the audio information to a number of computers via a large computer network, such as the Internet.

In accordance with the IS-707 standard, which includes IS-707.4 for asynchronous data services and IS-707.5 for packet data services, the data exchanged between a transmitter and a receiver is processed in discrete packets, otherwise known as data packets or data frames, or simply frames. To increase the likelihood that a frame will be successfully transmitted during a data transmission, IS-707 employs a radio link protocol (RLP) to track the frames transmitters successfully and to perform frame retransmission when a frame is not transmitted successfully. In addition to RLP, higher layer data protocols are also used to ensure that frames are successfully received. For example, the well known TCP protocol is used in an asynchronous data service environment, (as explained in IS-707.4) and the UDP protocol is used in a packet data service environment (as explained in IS-707.5) in addition to the RLP protocol.

One of the primary problems of transmitting time-sensitive information using data protocols is the delay, or latency, caused by the non-continuous nature of data communications. Delays of more than a few hundred milliseconds can result in disruptions in the time-sensitive information being transmitted. When transmitting data, such as computer files, time delays are easily tolerated due to the non real-time nature of data. However, time-sensitive information needs to received continuously in order to be faithfully recreated.

At a transmitter, the TCP and UDP protocols mentioned above rely on filling a TCP or UDP segment with a selected number of bits, often referred to as a minimum segment size, then transmitting the segment. If a large amount of data is available for transmission in a voice-over-data system, a delay may be introduced in converting the available time-sensitive information into numerous TCP or UDP segments. On the other hand, if a small amount of time-sensitive information is available to be transmitted, a TCP or UDP segment will not be immediately generated unless the amount of available time-sensitive information is enough to fill the segment. This also introduces a time delay into the transmission process.

If the TCP or UDP minimum segment size is chosen to be relatively large, latency will increase due to the fact that a segment will only be transmitted if the minimum segment size is met. On the other hand, if the minimum segment size is chosen to be relatively small, a significant drain on processing resources will occur in the transmitter to process the numerous segments needed for transmission of even a small amount of information.

What is needed is a method and apparatus for optimizing the segment size so that time-sensitive information is transmitted smoothly, without a change to existing data protocols.

SUMMARY

The detailed embodiments include a method and apparatus for efficient data transmission in a wireless voice-over-data communication system, thereby reducing latency associated with such a communication system. Specifically, this is achieved by defining a minimum segment size and a maximum segment size, thereby allowing both larger and smaller segments to be transmitted as data becomes available for transmission.

In one embodiment, TCP segments are used for transmitting time-sensitive information, generally audio information, using an asynchronous data format in accordance with IS-707.4 and UDP segments are used for transmitting audio information using a packet data format in accordance with IS-707.5. In a first embodiment of the present invention, a first segment size and a second segment size are chosen. The first segment size represents a minimum segment size that can be transmitted. The second segment size represents a maximum segment size that can be transmitted. A segment is generated and transmitted whenever a quantity of time-sensitive information available for transmission allows a segment to be constructed having a segment size between the minimum segment size and the maximum segment size. A segment of any size up to the maximum segment size is also created and transmitted whenever any time-sensitive information is available for transmission and an acknowledgement message is received by the transmitter.

In a second embodiment, segments are created and transmitted at predetermined time intervals, generally with respect to a number of vocoder frames available for transmission. This embodiment is inopposite to prior art data protocols in that segments are transmitted at regular time intervals, rather than being dependent upon filling the segment with a minimum number of bytes before a transmission can take place.

In a third embodiment, in a transmitter that uses a variable rate vocoder, bits are added to low-rate vocoder frames in order to decrease the ratio of maximum vocoder frame size to minimum vocoder frame size. Testing has shown that as this ratio is decreased, certain audio distortions are reduced or eliminated, such as syllable dropouts at the start of sentences.

DETAILED DESCRIPTION OF THE PREFERRED EMBODIMENTS

The embodiments described herein are described with respect to a wireless communication system operating in accordance with the use of CDMA signal processing techniques of the IS-95 and IS-707 Interim Standards. While the present invention is especially suited for use within such a communications system, it should be understood that the present invention may be employed in various other types of communications systems that transmit information in discreet packets, otherwise known as segments, data packets, data frames, or simply frames, including both wireless and wireline communication systems, computer networks, and satellite-based communication systems. Additionally, throughout the description, various well-known systems are set forth in block form. This is done for the purpose of clarity.

Various wireless communication systems in use today employ fixed base stations that communicate with mobile units using an over-the-air interface or wireless communication channel. Such wireless communication systems include AMPS (analog), IS-54 (North American TDMA), GSM (Global System for Mobile communications TDMA), and IS-95 (CDMA). In a preferred embodiment, the present invention is implemented in a CDMA system.

Figure 1:
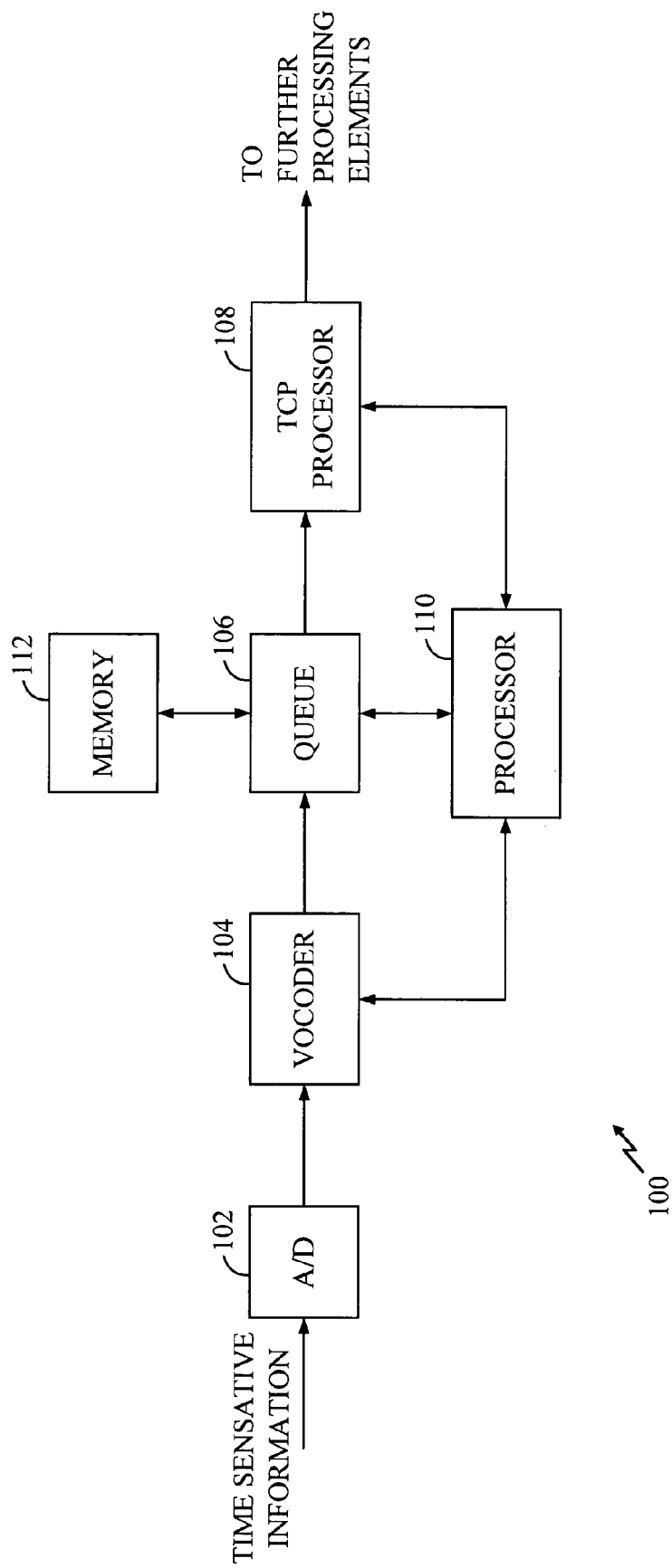
FIG. 1 illustrates a first embodiment as used within a transmitter used in a voice-over-data communication system.

FIG. 1 illustrates a block diagram of a transmitter 100, used in a voice-over-data communication system. A voice-over-data communication system, as described herein, refers to any communication system where time-sensitive information is transmitted in data segments, segments, data packets or frames using data protocols. Examples of time-sensitive information includes audio information, such as human speech, or video information, such as television signals or movies. The term "voice-over-data" generally refers to a communication system which transmits human speech, or voice, using predefined data protocols, such as the well-known TCP or UDP data protocols.

Transmitter 100 is shown configured for use in an exemplary embodiment of the present invention. Such a transmitter 100 may be located in a base station or in a mobile telephone as used in a wireless communication system. It should be understood that FIG. 1 is a simplified block diagram of a complete transmitter and that other functional blocks have been omitted for clarity. Transmitter 100 as shown in FIG. 1 is not intended to be limited to any one particular type of transmission modulation, protocol, or standard. In addition, the functions of each block may reside in single or multiple processors executing preprogrammed instruction sets, may reside in one or more ASICS, or may reside in discreet processing elements, all of which are well known in the art.

As shown in FIG. 1, time-sensitive information, generally in analog format, is provided to analog-to-digital (A/D) converter 102. A/D 102 uses well-known techniques to transform the time-sensitive information into a digitized signal. A/D 102 may perform low-pass filtering, sampling, quantizing, and binary encoding on the time-sensitive information to produce the digitized signal, as is well known in the art.

The digitized signal is then provided to vocoder 104. Vocoder 104 is a well-known device for compressing the digitized voice signal to minimize the bandwidth required for transmission. Vocoder 104 generates consecutive vocoder frames, otherwise known as data frames, generally at regular time intervals, such as every 20 milliseconds in the exemplary embodiment, although other time intervals could be used in the alternative. The length of each data frame is therefore 20 milliseconds.

One way that may vocoders maximize signal compression is by detecting periods of silence in a voice signal. For example, pauses in human speech between sentences, words, and even syllables present an opportunity for many vocoders to compress the bandwidth of the voice signal by producing a data frame having little or no information contained therein.

Vocoders may be further enhanced by encoding data frames at variable data rates. An example of such a variable rate vocoder is found in U.S. Pat. No. 5,414,796 (the '796 patent) entitled "VARIABLE RATE VOCODER", assigned to the same assignee and incorporated by reference herein. When little or no information is available for transmission, variable rate vocoders produce data frames at reduced data rates, thus increasing the transmission capacity of the wireless communication system. In the variable rate vocoder described by the '796 patent, data frames comprise data at either full, one half, one quarter, or one eighth the data rate of the highest vocoder encoding rate.

Data frames generated by vocoder 104 are stored in a queue 106, or sequential memory, to be later digitally modulated and then upconverted for wireless transmission. Queue 106 is a memory for storing sequential vocoder frames from vocoder 104, then providing the vocoder frames to TCP processor 108 in a first in, first out basis. In the present invention, vocoder frames are encoded into data packets by TCP processor 108 prior to transmission, because data packets can be easily manipulated for such applications as voice encryption using, for example, public-key encryption techniques. Data packets can also be readily transmitted between a large interconnection of computer networks, such as the Internet.

Vocoder frames stored in queue 106 are provided to TCP processor 108, where they are transformed into data packets, otherwise known as data segments, TCP segments, or simply segments, suitable for the particular type of data protocol used in a computer network such as the Internet. For example, in the exemplary embodiment, the frames from queue 106 are formatted into TCP segments. TCP is a well-known data protocol used to transmit data over large public computer networks, such as the Internet. Other well-known data protocols may be used in the alternative, such as the UDP data protocol. TCP processor 108 may be a hardware device, either discreet or integrated, or it may comprise a microprocessor running a software program specifically designed to transform vocoder frames into data segments suitable for the particular data protocol at hand.

Figure 2:
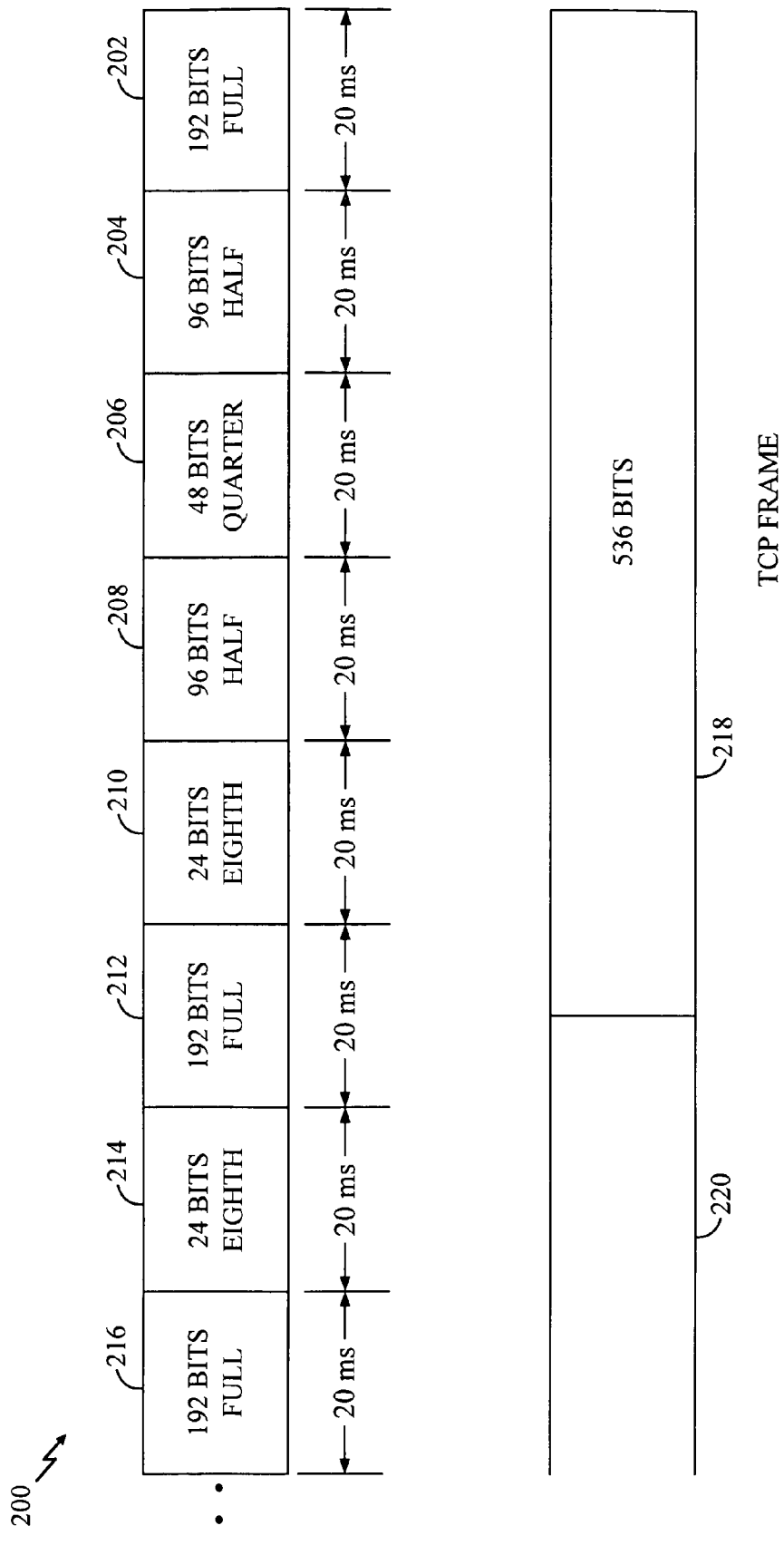
FIG. 2 illustrates how variable-rate vocoder frames are converted into TCP segments by a TCP processor used in the transmitter of FIG. 1.

FIG. 2 illustrates how variable-rate vocoder frames stored in queue 106 are converted into TCP segments by TCP processor 108. Data stream 200 represents the contents of queue 106, shown as a series of sequential vocoder frames, each vocoder frame having a frame length of 20 milliseconds. It should be understood that other vocoders could generate vocoder frames having frame lengths of a greater or smaller duration.

As shown in FIG. 2, each vocoder frame contains a number of information bits depending on the data rate for the particular frame. In the present example of FIG. 2, vocoder frames contain data bits equal to 192 for a full rate frame, 96 bits for a half rate frame, 48 bits for a quarter rate frame, and 24 bits for an eighth rate frame. As explained above, frames having high data rates represent periods of voice activity, while frame having lower data rates are representative of periods of less voice activity or silence.

TCP processor 108 fills a TCP frame sequentially with bits contained in each vocoder frame from queue 106. For example, in FIG. 2, the 192 bits contained within vocoder frame 202 are first placed within TCP segment 218, then the 96 bits from vocoder frame 204, and so on until 536 bits have been placed within TCP segment 218. Note that vocoder frame 212 is split between TCP segment 218 and TCP segment 220 as needed to fill TCP segment 218 with 536 bits.

It should be understood that TCP segments are not generated by TCP processor 108 on a continuous basis, due to the nature of the variable rate vocoder frames and due to the processing capabilities of processor 110. In the first case, if no information is available for transmission in queue 106, a long series of low-rate vocoder frames will be produced by vocoder 104. Therefore, many low-rate vocoder frames will be needed to fill the 536 bits needed for a TCP segment, and, thus, a TCP segment will be produced more slowly. Conversely, if high voice activity is present, a series of high-rate vocoder frames will be produced by vocoder 104. Therefore, relatively few vocoder frames will be needed to fill the 536 bits necessary for a TCP segment, thus, a TCP segment will be generated more quickly.

In the second case, the process of generating TCP segments is one of several concurrent processes occurring within transmitter 100. Generally, processor 110 coordinates the various activities occurring within transmitter 100 on a sequential basis. That is, each process occurring within transmitter 100 is preformed in a predefined sequence, allowing for emergency processes, called interrupts, to take place. As a result, TCP segments are generated only when processor 110 has performed the sequential list of other processes required to be performed. Therefore, TCP segments are generated by TCP processor only at discreet time intervals when directed to do so by processor 110.

TCP segments are characterized by having a duration measured by the number of bits contained within each segment. As shown in FIG. 2, a typical TCP segment length can be 536 bits, although other TCP segments may have a greater or smaller number of bits. The length of a TCP segment is generally negotiated between a transmitter and a receiver prior to the start of communications. Such negotiations are well-known in the art. For example, IS-707.4 and Internet Engineering Task Force RFC 793 describe details on how a TCP segment size is negotiated. In prior art communication systems, the segment length is chosen based on the need to efficiently transmit data frames from transmitter to receiver.

In one embodiment, two segment sizes are defined. A first segment size represents a minimum segment size that can be transmitted. A second segment size represents a maximum segment size that can be transmitted. The second segment size is equivalent to the prior art segment size, and is negotiated between a transmitter and a receiver prior to the start of communications. The first segment size is predefined and stored in a memory 112 within transmitter 100.

A TCP segment is created and transmitted whenever a quantity of time-sensitive information available in queue 106 allows a segment to be constructed having a segment size between the minimum segment size and the maximum segment size. A segment of any size up to the maximum segment size is also created and transmitted whenever any time-sensitive information is available for transmission and an acknowledgement message is received by transmitter 100. This is explained in more detail, below.

As noted previously, TCP segments are generally not produced on a continuous basis. The segment generation process occurs as one of many parallel processes ongoing within transmitter 100. Generally, transmitter 100 comprises processor 110, which coordinates the various activities occurring within transmitter 100. As a result, segment generation occurs only when processor 110 has performed other functions having a higher priority than the segment generation process, or when the segment generation process occurs sequentially in the list of functions required to be performed by processor 110.

When processor 110 determines that the segment generation process is to be performed, it instructs TCP processor to determine the whether enough data is available in the vocoder frames stored within queue 106 to create a TCP segment having a segment size greater than or equal to the minimum segment size, as previously determined and stored within memory 112. If so, a TCP segment is created, having a minimum number of bits equal to the minimum segment size and having a maximum size equal to the maximum segment size as negotiated between transmitter 100 and a receiver. If excess data remains to be transmitted in queue 106 above the maximum segment size, a second TCP segment is created if a segment having at least the minimum segment size can be created from the excess data. If so, a second TCP segment is created. If not, the excess data remains stored in queue 106 until processor 110 instructs TCP processor to once again determine the amount of data stored in queue 106. Additional vocoder frames are likely to be created and stored within queue 106 during the time that processor 110 performs other necessary functions within transmitter 100.

The disclosed embodiments minimize the problems of latency caused by discontinuous transmission of data awaiting to be transmitted in queue 106. In prior art systems, data was not transmitted until the predetermined queue size was met. A relatively large amount of time could transpire before enough data filled queue 106 with enough data to satisfy the predetermined minimum segment size. Therefore, relatively large delays could be introduced into the transmission of time-sensitive data. The disclosed embodiments minimize this latency by using a two size segment approach. The minimum segment size allows TCP segments to be generated more quickly, thus at a more regular rate. Vocoder frames awaiting transmission in queue 106 are transmitted more quickly due to the smaller amount of data needed to create a segment. A second advantage of the two segment size approach is that larger segments can be transmitted when a large amount of data is generated and stored in queue 106. In this case, segments are created having a segment size equal to the maximum segment size. This allows more efficient processing and reduces the overhead associated with generating many TCP segments.

In addition to generating and transmitting segments as described above, a segment may be generated whenever an acknowledgement message is received by transmitter 100. Acknowledgement messages are used in some data protocols, such as TCP, to notify a transmitter when a segment or batch of segments have been received without error. In such systems, a timer located within a transmitter is started whenever a segment or batch of segments are transmitted. When a segment or batch of segments are received without error at a receiver, an acknowledgment message is generated by the receiver and sent to the transmitter to inform the transmitter that the segment or batch of segments was properly received. If an acknowledgement message is not received by the transmitter within a predetermined amount of time, the segment or batch of segments are re-transmitted.

When an acknowledgment message is received by a transmitter, it indicates that the transmission channel quality between the transmitter and a receiver is good and that the chance for errors in transmission is low. In one embodiment, when an acknowledgment message is received by transmitter 100, processor 110 instructs TCP processor to generate a TCP segment, no matter how much data is stored in queue 106. Therefore, TCP segments can be created having a segment size less than the minimum segment size, up to a maximum size of the maximum segment size.

In a second embodiment, TCP segments are created and transmitted at predetermined time intervals, generally with respect to a number of vocoder frames available for transmission. This embodiment is inopposite to prior art data protocols in that segments are transmitted at regular time intervals, rather than being depending upon filling the segment with a minimum number of bytes before a transmission can take place.

As described above, processor 110 performs several processes within transmitter 100 on a sequential basis. At a predetermined point during the sequence, processor 110 instructs TCP processor to create one or more TCP segments, if enough data exists in queue 106. In this embodiment, if a predetermined number of vocoder frames have been stored within queue 106, a TCP segment is generated by TCP processor 108. In the exemplary embodiment, the predetermined number of vocoder frames is 10 frames. This embodiment eliminates the transmission delays associated with waiting for a predetermined number of bits to be available in queue 106 prior to generating a TCP segment. Therefore, TCP segments are generate on a more-regular basis, thereby reducing latency and other problems associated with irregular data transmissions of the prior art.

In a third embodiment, in a transmitter that uses a variable rate vocoder, bits are added to low-rate vocoder frames in order to decrease the ratio of maximum vocoder frame size to minimum vocoder frame size. Testing has shown that as this ratio is decreased, certain audio distortions are reduced or eliminated, such as syllable dropouts at the start of sentences.

In the third embodiment, as vocoder frames are generated by vocoder 104, processor 110 adds random bits to any vocoder frame that does not contain a predetermined number of bits, i.e., low-rate encoded vocoder frames. Bits are added until the number of bits contained within the vocoder frame is equal to the predetermined number of bits. Adding bits to low-rate encoded vocoder frames allows more uniformity in the average number of bits in each vocoder frame stored in queue 106, and thus, the rate at which TCP segments are generated.

Figure 3:
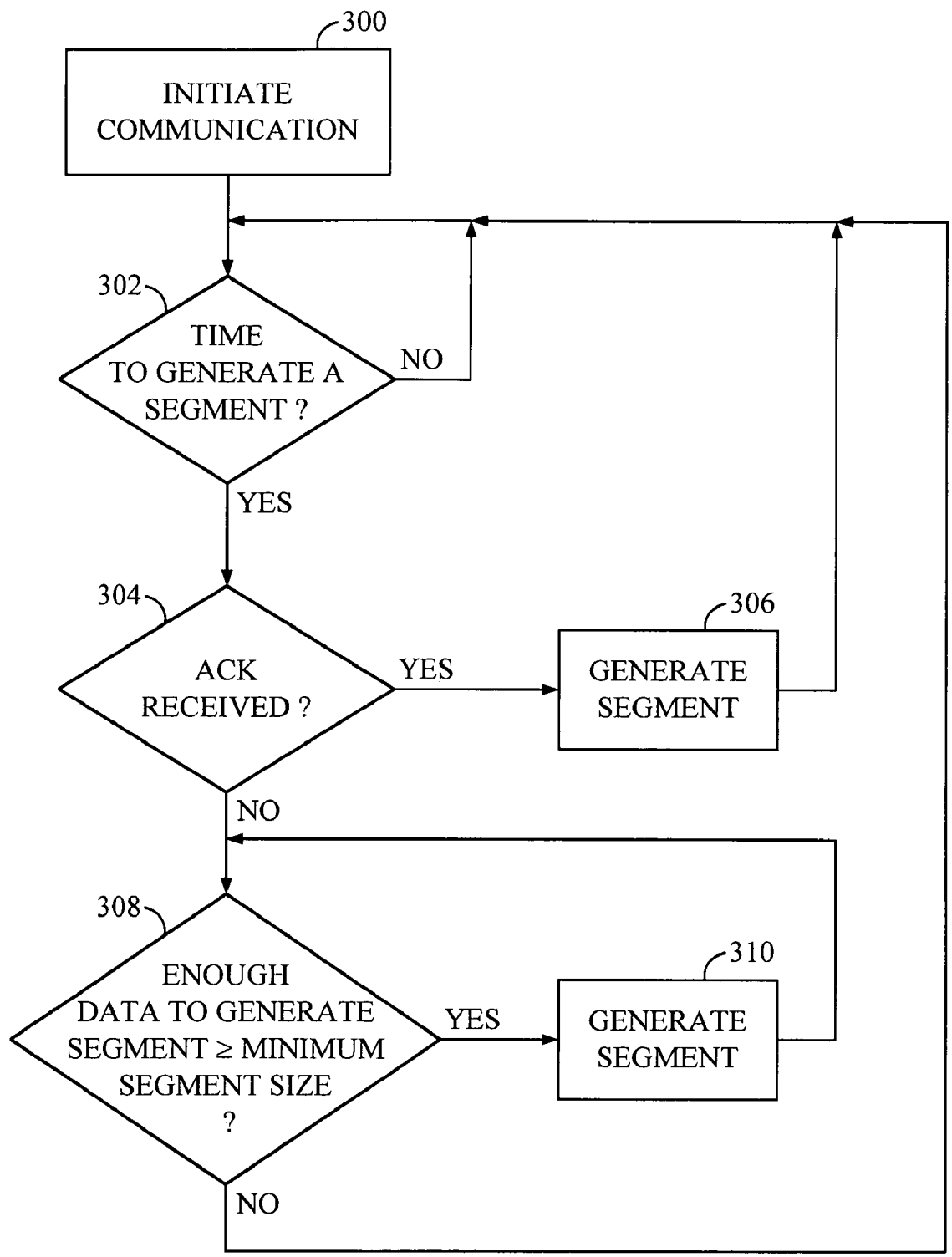
FIG. 3 is a flow diagram detailing the method of the first embodiment.

FIG. 3 is a flow diagram detailing the method of the first embodiment. In step 300, communications are initiated between a transmitter and a receiver. As part of the initialization process, a data protocol is negotiated between the transmitter and the receiver, such as TCP or UDP. In some protocols, such as TCP, a maximum segment size is negotiated between the transmitter and the receiver as well. The negotiation process is well-known in the art. The maximum segment size defines the largest segment size that will be transmitted to the receiver. In many data protocols, segments having a smaller segment size are permitted to be transmitted as well. In addition to a maximum segment size, a minimum segment size is predefined and stored within a memory at the transmitter as well. The minimum segment size is generally not negotiated between the transmitter and the receiver.

Once communications have been initialized, time-sensitive information, such as human speech, is transmitted between the transmitter and the receiver. In step 302, TCP processor 108 awaits instructions from processor 110 for TCP processor 108 to determine whether enough data exists within queue 106 in order to generate a segment. When processor 110 instructs TCP processor to generate a segment, processing continues to step 304.

In step 304, TCP processor 108 determines if an acknowledgment message has been received within a predetermined time period. The receipt of an acknowledgment message from the receiver is an indication that the communication channel quality is acceptable, and that there is a high likelihood that further transmission will be received successfully. Not all data protocols use an acknowledgement based system. For example, the UDP protocol does not use acknowledgment messages to alert a transmitter that the communication channel quality is good. In these kinds of protocols, step 304 is bypassed.

If an acknowledgement message has been received within the predetermined time period, a segment is generated from any data available in queue 106, as shown in step 306. The resulting segment may have a segment size smaller than the minimum segment size or larger than the minimum segment size, up to the maximum segment size. If more data is available in queue 106 after generating a maximum size segment, that data is sent in a second segment, and if necessary, subsequent segments. Processing then reverts back to step 302, where TCP processor 108 awaits the next instruction from processor 110 to check queue 106 again.

If an acknowledgment message has not been received within the predetermined time period, or if an acknowledgment based data protocol is not used, processing continues to step 308. In step 308, TCP processor 108 checks queue 106 to determine if enough data is stored within queue 106 to generate a segment having a segment size equal to or greater than the minimum segment size. If so, step 310 is performed, in which TCP processor generates a segment having a segment size between the minimum segment size and the maximum segment size. If more data is available in queue 106 after generating a maximum size segment, that data is sent in a second segment, and if necessary, subsequent segments. Processing then reverts back to step 302, where TCP processor 108 awaits the next instruction from processor 110 to check queue 106 again.

If the data stored within queue 106 is not sufficient to generate a segment having a segment size greater than or equal to the minimum segment size, TCP processor 108 does not generate a segment, and processing continues to back to step 302, where TCP processor awaits the next instruction from processor 110 to check queue 106 again.

The disclosed embodiments have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A transmitter for generating segments of time-sensitive information to be wirelessly transmitted to a receiver, comprising:
   a queue for storing a plurality of data frames representing time-sensitive information;
   a memory for storing a minimum segment size and a maximum segment size of the segments; wherein the minimum segment size is predefined and wherein the maximum segment size is negotiated between the transmitter and the receiver;
   a processor for generating a first segment, corresponding to at least a portion of the time-sensitive information, when a quantity of the time-sensitive information in the queue allows the first segment to have a first segment size between the minimum segment size and the maximum segment size; and
   wherein the processor generates a second segment, corresponding to at least another portion of the time-sensitive information, upon receipt of an acknowledgement message from a receiver, wherein the second segment comprises a second segment size less than the minimum segment size.

2. The transmitter of claim 1, wherein the processor generates one or more subsequent segments after the second segment if more of the time-sensitive information is available in the queue, wherein the one or more subsequent segments have any size up to the maximum segment size.

3. The transmitter of claim 1, wherein the processor further comprises a first processor and a data protocol processor, wherein the first processor provides the data protocol processor with an instruction to generate the first data segment, wherein the data protocol processor generates the first segment and the second segment, and wherein the data protocol processor generates one or more subsequent segments after the second segment, based on the acknowledgement message, if more of the time-sensitive information is available in the queue.

4. The transmitter of claim 1, wherein the processor further comprises a first processor and a data protocol processor, wherein the first processor provides the data protocol processor with an instruction to generate the first data segment, wherein the data protocol processor generates the first segment and the second segment, and wherein the data protocol processor is further operable, after generating the first segment based on the instruction, to generate one or more subsequent segments if the acknowledgement message is not received and if a remaining quantity of the time-sensitive information in the queue allows each of the one or more subsequent segments to have a respective segment size equal to or greater than the minimum segment size.

5. The transmitter of claim 1, wherein the queue receives the respective time-sensitive information corresponding to the first segment before the respective time-sensitive information corresponding to the second segment.

6. The transmitter of claim 1, wherein the minimum segment size is predefined and wherein the maximum segment size is negotiated between the transmitter and the receiver.

7. The transmitter of claim 1, wherein both of the first segment and the second segment comprise a data packet representing audio information or video information.

8. The transmitter of claim 1, wherein the acknowledgement message represents a confirmation of a receipt of the first segment by the receiver.

9. The transmitter of claim 1, further comprising a vocoder for generating the plurality of data frames representing the time-sensitive information.

10. The transmitter of claim 1, further comprising an analog-to-digital converter for digitizing the time-sensitive information.

11. A transmitter for generating segments of time-sensitive information to be wirelessly transmitted to a receiver, comprising:
    means for queuing a plurality of data frames representing time-sensitive information;
    means for storing a minimum segment size and a maximum segment size of the segments; wherein the minimum segment size is predefined and wherein the maximum segment size is negotiated between the transmitter and the receiver;
    means for generating a first segment, corresponding to at least a portion of the time-sensitive information, when a quantity of the time-sensitive information in the means for storing the plurality of data frames allows the first segment to have a first segment size between the minimum segment size and the maximum segment size; and
    wherein the means for generating generates a second segment, corresponding to at least another portion of the time-sensitive information, upon receipt of an acknowledgement message from a receiver, wherein the second segment comprises a second segment size less than the minimum segment size.

12. A method of generating segments of time-sensitive information to be wirelessly transmitted to a receiver, comprising:
    queuing a plurality of data frames representing time-sensitive information;
    storing a minimum segment size and a maximum segment size of the segments; wherein the minimum segment size is predefined and wherein the maximum segment size is negotiated with the receiver;
    generating a first segment, corresponding to at least a portion of the time-sensitive information, when a queued quantity of the time-sensitive information allows the first segment to have a first segment size between the minimum segment size and the maximum segment size; and generating a second segment, corresponding to at least another portion of the time-sensitive information, upon receipt of an acknowledgement message from a receiver, wherein the second segment comprises a second segment size less than the minimum segment size.

13. The method of claim 12, further comprising generating one or more subsequent segments after the second segment if more of the time-sensitive information is available in the queue, wherein the one or more subsequent segments have any size up to the maximum segment size.

14. The method of claim 12, further comprising receiving an instruction to generate the first data segment, and further comprising generating one or more subsequent segments after the second segment, based on the acknowledgement message, if more of the time-sensitive information is available in the queue, wherein the one or more subsequent segments have any size up to the maximum segment size.

15. The method of claim 12, further comprising receiving an instruction to generate the first data segment, and further comprising, after generating the first segment based on the instruction, generating one or more subsequent segments if the acknowledgement message is not received and if a remaining stored quantity of the time-sensitive information allows each of the one or more subsequent segments to have a respective segment size equal to or greater than the minimum segment size.

16. The method of claim 12, further comprising receiving the respective time-sensitive information corresponding to the first segment before receiving the respective time-sensitive information corresponding to the second segment.

17. The method of claim 12, wherein the minimum segment size is predefined and further comprising negotiating the maximum segment size with the receiver.

18. The method of claim 12, wherein generating both of the first segment and the second segment further comprises generating a respective data packet representing audio information or video information.

19. The method of claim 12, further comprising receiving the acknowledgement message in confirmation of a receipt of the first segment by the receiver.

20. The method of claim 12, further comprising generating the plurality of data frames representing the time-sensitive information.

21. The method of claim 12, further comprising digitizing the time-sensitive information.

\* \* \* \* \*

UNITED STATES PATENT AND TRADEMARK OFFICE
CERTIFICATE OF CORRECTION

PATENT NO.         : 7,522,631 B1                                     Page 1 of 1
APPLICATION NO.    : 09/429406
DATED              : April 21, 2009
INVENTOR(S)        : Brown et al.

It is certified that error appears in the above-identified patent and that said Letters Patent is hereby corrected as shown below:

Column 9, line 47, claim 1: "a receiver" to read as --the receiver--

Column 10, line 49, claim 11: "a receiver" to read as --the receiver--

Column 11, line 3, claim 12: "a receiver" to read as --the receiver--

Signed and Sealed this
Twenty-eighth Day of June, 2011

David J. Kappos
*Director of the United States Patent and Trademark Office*